United States Patent [11] 3,617,906

[72] Inventor Ruben D. Garzon
 Malvern, Pa.
[21] Appl. No. 35,174
[22] Filed May 6, 1970
[45] Patented Nov. 2, 1971
[73] Assignee I-T-E Imperial Corporation
 Philadelphia, Pa.

[54] CURRENT ZERO ANTICIPATING CIRCUIT FOR ASYMMETRIC WAVES
 6 Claims, 1 Drawing Fig.

[52] U.S. Cl. ................................................ 328/150,
 307/237, 328/109, 328/114, 328/117, 328/139
[51] Int. Cl. ........................................................ H03k 5/20
[50] Field of Search............................................ 307/232,
 235, 252.74, 237; 328/54, 144, 104, 109, 114,
 115, 117, 139, 150, 141

[56] References Cited
UNITED STATES PATENTS

| | | | |
|---|---|---|---|
| 2,499,534 | 3/1950 | Sorber............................ | 328/109 |
| 2,999,925 | 4/1961 | Thomas.......................... | 328/54 |
| 3,209,261 | 9/1965 | Critchcow..................... | 328/114 |
| 3,506,852 | 4/1970 | De Hart......................... | 307/252 |
| 3,524,075 | 8/1970 | Matthews...................... | 307/232 |

Primary Examiner—Donald D. Forrer
Assistant Examiner—David M. Carter
Attorney—Ostrolenk, Faber, Gerb & Soffen ABSTRACT: A signal pulse is generated a given time before an asymmetric current passes through its zero value by phase shifting both the sinusoidal term and exponential term of the defining current waveform, by adding the two-phase shifted components, and by processing the resulting phase shifted wave to obtain the pulses where desired.

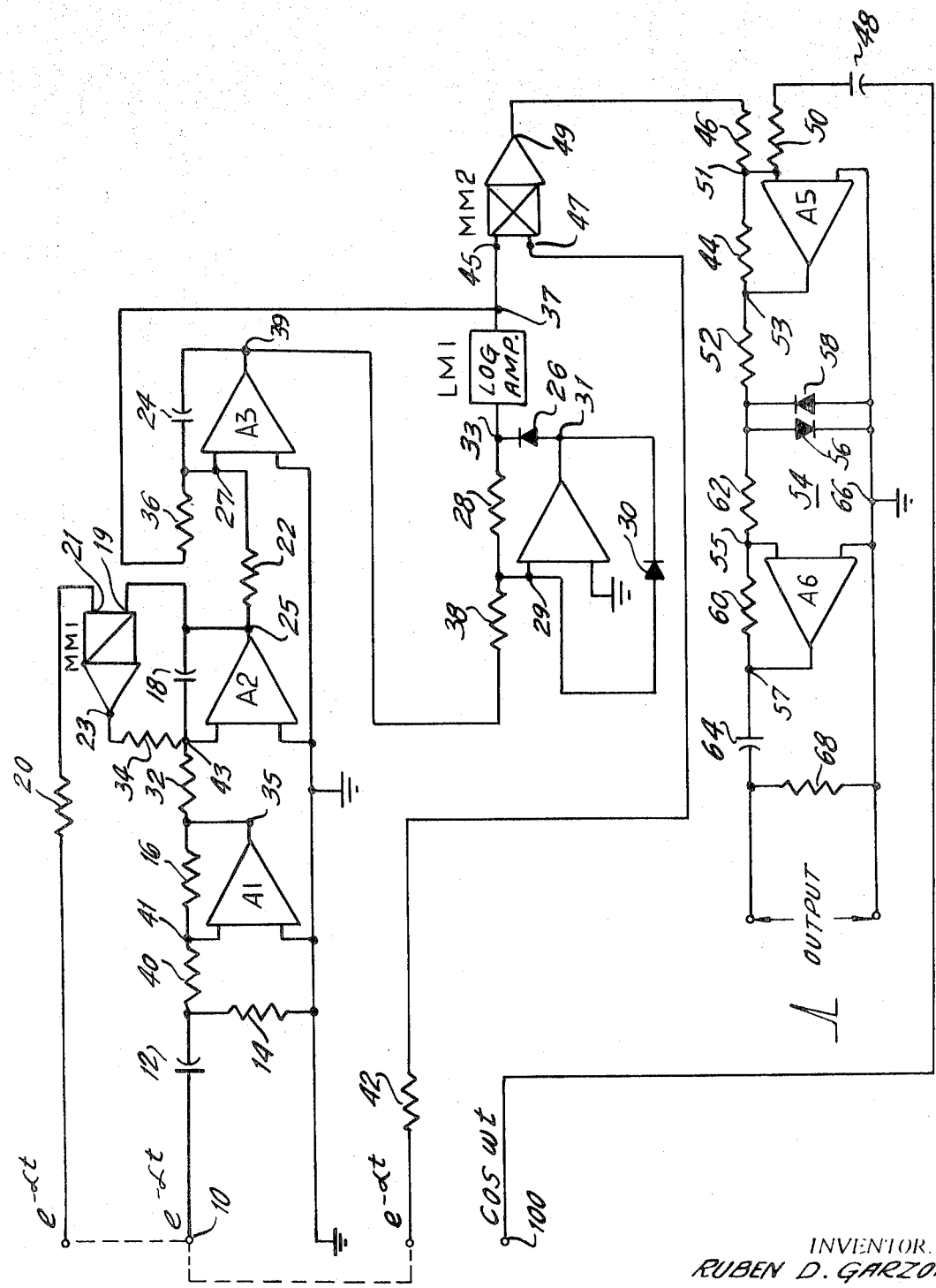

CURRENT ZERO ANTICIPATING CIRCUIT FOR ASYMMETRIC WAVES

This invention relates to a current zero anticipating circuit and, more particularly, relates to an electronic circuit for generating a pulse at a given time prior to the passage through zero of an asymmetric current being monitored. As such, this invention is somewhat similar to that described in my application Ser. No. 41,921, filed May 28, 1970, entitled "Current Zero Anticipating Circuit" assigned to the same assignee as is this case.

A significant application for circuits of this type is in the operation of synchronous circuit interrupters whose contacts are controlled to separate just prior to a zero crossing of the current wave. As is well known, by separating such contacts prior to zero current, contact wear will be reduced and low current rated interrupters can be employed in high current systems. As is also well known, interrupters of this type by and large operate by measuring line current and by delivering an impulse just prior to the occurrence of zero current in a line being protected, which impulse is used to open an associated circuit breaker or switch. By synchronizing the breaking command with the zero point of the current to be broken, the loading on the circuit breaker will be substantially reduced.

Circuit interrupters of this general type are well known. On electronic circuit which performs this operation is disclosed by U.S. Pat. No. 3,315,169, to Nitta et al. This type circuit operates by obtaining a DC voltage proportional to the magnitude of the AC current wave and by comparing the DC voltage with an AC component similar in waveshape to the current to be broken. When the DC voltage exceeds the AC comparing voltage, the breaking command pulse is generated, at a time in advance of the zero crossing point of the current. One disadvantage of this arrangement, however, is that the amplitude of the pulse so obtained can not be readily controlled, nor can the time of advance before zero current be controlled because the point of intersection of the two voltages being compared considerably varies for currents of different asymmetric waveshape.

A second type of circuit which performs the above-described operation operates by developing a first signal which is proportional to the current flowing and a second signal which is proportional to the derivative to the current, and to then add these two signals. The total signal when the current is a pure sine wave will have a waveshape which leads that of the current being monitored by a given angle, depending on the relative magnitude of the two developed signals. Any suitable circuit can then be used to generate the pulse when the total signal passes through zero, this occurring at some given time before the current being monitored passes through zero. However, while this circuit (disclosed by U.S. Pat. No. 3,388,361) is suitable for symmetric currents, such circuit has been found to be generally unsuitable when the current monitored is of asymmetric waveshape.

These disadvantages of prior art circuits by and large result because only the sinusoidal component of the asymmetric wave is phase shifted, with no attempt being made to shift the exponential component of the wave. Since only the sinusoidal term is advanced, it becomes quite difficult to obtain an exact indication as to when the breaking pulse should be developed. This deviation from the nominal pretime will be seen to depend on the degree of asymmetry. as well as on the rate of decay of the exponential term of the asymmetric wave.

As will become clear hereinafter, the current zero anticipating circuit of the present invention provides a totally electronic approach to generating the desired pulse prior to the occurrence of a zero crossing of an asymmetric current. In accordance with the invention, apparatus is included to phase shift the sinusoidal component and, also, the exponential component, and to shift both by the same amount. The two phase-shifted components are then added, and the resulting phase-shifted wave processed in a suitable manner to obtain the desired signal pulses in advance of the zero crossings of the intitiating current.

Accordingly, it is an object of the present invention to provide a current zero anticipating circuit which electronically produces an output signal a fixed time prior to a zero crossing for a current of asymmetric waveshape.

It is another object of the present invention to provide such an arrangement suitable for construction using solid state components to increase system reliability and to enhance the degree of imperviousness of the system to mechanical shock or vibrations.

These and other objects of the invention will be more clearly understood from a consideration of the following description taken in connection with the accompanying drawing which shows a current zero anticipating circuit constructed in accordance with the present invention.

Before considering the construction of the drawing, however, the following mathematical analysis should be noted. As will be seen, once the mathematical result is validly established, the selection of specific electronic circuits to perform the required mathematical functions can be readily made. In all respects, it will be seen that the current zero anticipating circuit is comprised entirely of conventional devices which are commercially available at the present time.

Assume, first, that the primary current being monitored is of the form:

$$i = e^{-\alpha t} - \cos \omega t \qquad (1)$$

where:

$\alpha = \omega/X$;

$X/R =$ the impedance to resistance $R$ ratio of the system and $\omega$ equals angular frequency. Since phase shifting of such an asymmetric current is necessary to obtain a signal at a time beta ($\beta$) ahead of the zero crossing, each component of the asymmetric current must be advanced by beta ($\beta$) seconds. That is, a signal must be developed from the asymmetric current having the form:

$$v = e^{-\alpha(t+\beta)} - \cos[\omega(t+\beta)] \qquad (2)$$

Consider first the exponential term:

$$e^{-\alpha(t+\beta)} \qquad (3)$$

This expression can be represented as $$e^{-\alpha(t+\beta)} = [e^{-\alpha t}][e^{-\beta\alpha}] \qquad (4)$$

By using the exponential term obtained from filtering the original signal, the following will be seen:

$$e^{-\alpha t} = f(t) \qquad (5)$$

differentiating:

$$\frac{d(e^{-\alpha t})}{dt} = \alpha e^{-\alpha t} \qquad (6)$$

dividing by the exponential and multiplying by ($\beta$):

$$\frac{-\alpha e^{-\alpha t}}{e^{-\alpha t}} = -\beta\alpha \qquad (7)$$

taking the anti-log:

$$ln^{-1}(-\beta\alpha) = e^{-\beta\alpha} \qquad (8)$$

By multiplying expression (8) by expression (5), there is obtained the result:

$$(e^{-\alpha t})(e^{-\beta\alpha}) \qquad (9)$$

which corresponds to the desired exponential containing a phase shift of $\beta$ seconds.

Having this expression, it becomes possible to shift the sinusoidal term $-\cos \omega t$ the same $\beta$ seconds and then add the two phase shifted terms to obtain a replica of the input signal advanced by a time $\beta$. In this respect, the sinusoidal term will be advanced the same amount of time $\beta$ as is the exponential term $e^{-\alpha t}$.

The effect of these processes is to shift the asymmetric wave a predetermined time and, as is conventional, obtain pulses from the resulting wave at its zero crossing to develop the command for circuit breaker or switch opening. However, it will be seen that this arrangement differs from that previously known in that the exponential component, as well as the sinusoidal component, is advanced in time. In the Nitta et al. arrangement described above, for example, the pulse signal is obtained either by comparing a capacitor charged to the peak of the signal and the full wave rectified signal, or by shifting the sinusoidal component of the signal and detecting its zero crossing. The present invention, by advancing the exponential component in addition to the sinusoidal component, provides a more exact indication of zero crossing, and one which does not depend on the degree of asymmetry or on the rate of decay of the exponential term.

With this in mind, reference should be had to the single FIGURE of the drawing showing an electronic circuit diagram of the invention for performing these phase shifts, additions, and pulse generations. That is, the electronic circuit shown consists of an array of components so interconneted to perform the mathematical functions outlined above.

Thus, filter circuits (not shown) are first included to separate the exponential component $e^{-\alpha t}$ from the sinusoidal component $\cos \omega t$ of the asymmetric current. (In actuality, this current of asymmetric waveshape is first converted to a corresponding voltage by a current transformer, linear coupler or Hall generator before the filtering and separation take place.) The exponential signal so obtained is applied to input terminal 10 of the apparatus, and is then differentiated by the combination of resistor 12 and capacitor 14 before application to an amplifier A1 for increasing the derivative of the signal to a suitable leverl.

The amplifier A1 may be of a readily obtainable operational amplifier construction arranged with resistive feedback through the element 16 to linear by amplify the exponential component of the asymmetric current. Such amplified signal is coupled by means of a second operational amplifier A2 having a feedback capacitor 18 to one input 19 of a multiplier module MM1. Also coupled to a second input 21 of the module MM1 is the exponential component of the signal itself, via a resistor 20. This combination of the amplifier A2 with the multiplier module MM1 is effective in connecting the modular arrangement in its dividing mode, and multiplying the resultant ratio by a built-in factor, in this case the phase shift $\beta$. Thus, the signal developed at the output terminal 23 of the module MM1 is of the form shown in expression (7) above, with the phase shift of $\beta$ seconds. This output signal is then coupled by means of operational amplifiers A3 and A4 to a logarithmic amplifier LM1, which is connected in its inverse mode so as to provide an output equal to the antilog of the input.

More particularly, the output 25 of amplifier A2 is coupled to the input 27 of the operational amplifier A3 by means of a resistor 22, with the amplifier A3 being arranged with a feedback network comprising capacitor 24. The amplifier A4, on the other hand, includes in its feedback network a first diode 26 and a resistor 28, with a second diode 30 being also connected between the input and output terminal 29, 31 of the amplifier A4. As shown, the arrangement is one in which the diodes 26 and 30 are series connected in a forward conducting polarity between the input terminal 29 of amplifier A4 and the input terminal 33 of the logarithmic amplifier LM1. Further resistive networks are included in the arrangement as thus-far described to aid in this obtaining of the phase shifted term and the antilog component. Thus, resistors 32 and 34 couple the output terminal 35 of amplifier A1 with the output terminal 23 of the multiplier module MM1, resistor 36 couples the input terminal 27 of amplifier A3 to the output terminal 36 of logarithmic amplifier LM1, and resistor 38 couples the output terminal 39 of amplifier A3 to the input terminal 29 of amplifier A4. Lastly, the differentiating circuit in the input circuit of amplifier A1 is coupled by means of resistor 40 to the input terminal 41 of the amplifier, while the input terminal 43 of amplifier A2 is directly coupled to the junction point of resistors 32 and 34.

The output signal of logarithmic module LM1 is of the form shown in expression (8) above, and is used as one input to a second multiplier module MM2 connected in its multiplying mode (terminal 45). The other input to the module MM2 is a signal of the form of the exponential component and is coupled to input terminal 47 of the module MM2 via a resistor 42. The output signal developed at terminal 49 of the module MM2 is then coupled as an input to an operational amplifier A5 connected in its lineraly amplifying mode with a feedback network including resistor 44. More particularly, this output signal is coupled from terminal 49 to amplifier input terminal 51 by a resistor 46, and is arranged to add at that input terminal 51 with the sinusoidal component of the asymmetric current waveform, phase shifted by the same $\beta$ seconds as the exponential component was phase shifted. As shown in the drawing, this sinusoidal component is coupled form input terminal 100 b means of a series-connected capacitor, resistor phase shift circuit 48, 50 to input terminal 51 of the amplifier A5. At the amplifier A5, both these phase-shifted signals add together to form a composite signal which passes through zero value on a time axis, a fixed time prior to the passage through zero of the monitored instantaneous current.

The linearly amplified signal from the unit A5 is then coupled from output terminal 53 via a further resistor 52 to a diode-clipping network 54 having oppositely poled parallel connected diodes 56, 58, connected between resistor 52 and ground 66. As will be appreciated, this network 54 clips the applied signal at a suitable level to produce a substantially square wave. The square wave signal is further coupled to the input of linearly arranged amplifier A6 which has a resistor 60 in its feedback network and a resistor 62 coupling the amplifier to the network 54. The amplified square wave developed at output terminal 57 is then differentiated by the network of capacitor 64 and resistor 68 to provide an output pulse each time the square wave crosses the zero axis of the developed signal.

In particular, the positive and negative going output pulses developed across resistor 68 substantially correspond in time to the discontinuities produced in the otherwise alternating signal waveform by the clipping action of rectifier diodes 56 and 58. Each of these pulses—the positive-going pulse initiated by the discontinuity preceding the rising portion of the clipped signal waveform and the negative going pulse initiated by the discontinuity preceding the falling portion of the clipped waveform—occur at a point in time ahead of the zero crossing of the added signal from the amplifier A5. No corresponding pulses are developed, but instead are substantially suppressed, where the asymmetric waveform from amplifier A5 reverses before crossing the zero current axis.

IN this respect, it will be seen that the module MM2 yields a signal of the form shown in expression (9) above and is added to the shifted sinusoidal term in amplifier A5. The signal so obtained by the amplifier A5 is thus a replica of the input signal shifted ahead of time by the same $\beta$ seconds when the amplifier arrangements A1 and A5 and their respective input circuits 12, 14, 40 and 48, 50 are selected to provide corresponding phase shifts for both the exponential and sinusoidal components. As noted above, this phase-shifted wave is then processed in a suitable manner to obtain the desired pulse used for the breaking commands. It will be seen, however, that this arrangement differs from those previously known in that the exponential component of the current being monitored is advanced in time as well as the conventionally advanced sinusoidal term. The nominal pretime advance for development of the breaking command will thus be more exact than where the sinusoidal term alone is advanced. Also, and perhaps more importantly, by so shifting the exponential term a corresponding amount as the shift of the sinusoidal component, the resulting pulse signals will occur at a time which does not vary significantly as the degree of asymmetry of the wave changes or as the rate of decay of the exponential term varies.

The functional relationship of the components of the drawings can be achieved by other suitable circuit modifications known to those skilled in the art. For example, instead of employing an amplifier A2 and a multiplier module MM1 connected together to provide a dividing mode, these units can be replaced by an elemental block providing a division of signals directly. Similarly, the combined arrangements of amplifiers A3 and A4 in conjunction with the logarithmic amplifier LM1 to provide the antilog of an applied signal may be replaced by corresponding elements to provide that result more directly. As will similarly be evident, different types of clipping networks may be provided, with the preferred arrangement being one which would give steep slope at the zero crossings of the wave. Using silicon rectifiers for the diode components 56 and 58, for example, will yield a substantially square wave signal having an approximate 1.2 volt swing, as each diode will become forward biased to ground point 66 when signal excursions at the clipping circuit 54 exceed a 0.6 volt magnitude.

Although there has been described a preferred embodiment of this novel invention, many variations and modifications will now be apparent to those skilled in the art. Therefore, this invention is to be limited, not by the specific disclosure herein, but only by the appending claims.

sixth embodiments of the invention in which an exclusive privilege or property is claimed are defined as follows:

1. A current zero anticipating circuit for generating a signal at a fixed time prior to the occurrence of a current zero in an electrical circuit in which the instantaneous current flowing is of asymmetric waveshape having an exponential component and a sinusoidal component, comprising:

first means coupled to said electrical circuit for generating a first signal proportional to the sinusoidal component of instantaneous current flowing in said electrical circuit;

second means coupled to said electrical circuit for generating a second signal proportional to the exponential component of instantaneous current flowing in said circuit;

third means for phase shifting said first signal by a given lead angle;

fourth means for phase shifting said second signal by substantially the same lead angle;

fifth means for adding said first and second phase shifted signals together to form a third signal, whereby said third signal passes through a zero value at a fixed time prior to the passage of said instantaneous current through zero;

and sixth means coupled to said fifth means for generating an output signal in advance of the passage through zero of said instantaneous current.

2. The current zero anticipating circuit of claim 1 wherein said last-mentioned means includes:

seventh means for clipping positive and negative portions of said third signal to provide a fourth signal having discontinuities caused by such positive and negative clipping action which precede in time, the zero value crossing of said third signal; and eighth means coupled to said seventh means for generating output signals substantially in time synchronism with said discontinuities of said fourth signal.

3. The current zero anticipating circuit of claim 2 wherein said seventh means includes a pair of oppositely poled, parallel connected rectifier diodes coupled to an output terminal of said fifth means for respectively clipping positive and negative portions of said third signal developed thereat.

4. The current zero anticipating circuit of claim 2 wherein said eight means includes a differentiating circuit having resistance and capacitance for delivering output pulses of opposite polarity substantially in time synchronism with said discontinuities of said fourth signal.

5. The current zero anticipating circuit of claim 1 wherein said third means includes a capacitor.

6. The current zero anticipating circuit of claim 1 wherein said fourth means includes;

seventh means for differentiating said second signal;

eighth means responsive to said second signal and to said differentiated second signal to provide a signal representative of the ratio thereof;

ninth means responsive to said provided signal representative of said ratio for generating a signal indicative of the antilogarithm of said ratio; and tenth means responsive to said second signal representative of the product of said second and said antilogarithm signals which exhibits a phase shift corresponding to said given lead angle.

* * * * *